US008812751B1

(12) United States Patent
Gelfond et al.

(10) Patent No.: US 8,812,751 B1
(45) Date of Patent: Aug. 19, 2014

(54) MEDIA DEVICE AUTO-DETECTION

(71) Applicant: Bose Corporation, Framingham, MA (US)

(72) Inventors: Neil B Gelfond, Shrewsbury, MA (US); Joeseph Allen Killough, Brookline, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 13/839,490

(22) Filed: Mar. 15, 2013

(51) Int. Cl.
*G06F 3/00* (2006.01)
*G06F 13/12* (2006.01)
*G06F 13/38* (2006.01)
*G06F 3/16* (2006.01)
*G06F 11/30* (2006.01)

(52) U.S. Cl.
CPC ............ *G06F 3/165* (2013.01); *G06F 11/3089* (2013.01)
USPC .................................. 710/17; 710/8; 710/62

(58) Field of Classification Search
None
See application file for complete search history.

(56) References Cited

U.S. PATENT DOCUMENTS

| | | | |
|---|---|---|---|
| 6,321,278 B1 | 11/2001 | Phu et al. | |
| 7,450,726 B2 | 11/2008 | Goyal | |
| 7,564,966 B2 | 7/2009 | Sano | |
| 8,213,625 B2 | 7/2012 | Yamkovoy et al. | |
| 8,222,641 B2 | 7/2012 | Yamkovoy et al. | |
| 8,325,931 B2 | 12/2012 | Howard et al. | |
| 2009/0175060 A1* | 7/2009 | Onishi et al. | 363/56.06 |
| 2012/0007671 A1* | 1/2012 | Kumagai et al. | 330/124 R |
| 2012/0237046 A1 | 9/2012 | Yamkovoy et al. | |

FOREIGN PATENT DOCUMENTS

JP          4182802 B2       11/2008

* cited by examiner

*Primary Examiner* — Zachary K Huson
(74) *Attorney, Agent, or Firm* — Schmeiser, Olsen & Watts LLP

(57) ABSTRACT

A method for detecting a media device comprises generating a waveform on a bias node of a demonstration system. The waveform has a fundamental frequency that is greater than a maximum frequency of a media frequency range of the demonstration system. The waveform is rectified to produce a detection signal. An impedance between the bias node and a ground is modified in response to a coupling of the media device to the bias node. An output signal changes state in response to a change in the detection signal due to the modification of the impedance.

20 Claims, 6 Drawing Sheets

MEDIA DEVICE AUTO-DETECTION

FIELD OF THE INVENTION

The invention relates generally to electronic systems. More specifically, the invention relates to the detection of a media device when connected to an electronic demonstration system.

BACKGROUND

Audio demonstration systems are commonly found in retail environments to demonstrate to a prospective consumer the qualities of the system. Such systems typically have a sample of audio content (e.g a playlist) chosen to demonstrate the system capabilities (e.g. audio range, bass or treble response) and to entice the consumer to purchase the system. These demonstration systems are also capable of accepting an external audio device so that that consumer can play the audio content they are most familiar with and to hear how the system responds to their favorite audio device. When the consumer plugs their device into the system, the system will automatically detect the device and play content from it.

U.S. Pat. No. 6,321,278 discloses a computer system audio circuit that is connected to a sound device, a combination game/MIDI/line-in/line-out/headphone jack, and internal loudspeaker. The circuit routes audio signals to a headphone, when the headphones are plugged into the headphone connector of the combination jack. In addition, the audio circuit switches and does not route audio signals to the internal loudspeaker nor external loudspeakers when the headphones are plugged in. Furthermore, if the external loudspeakers are plugged into the line-out connector of the combination jack, the circuit provides audio to the external loudspeakers but not the internal loudspeaker. This system detects the connection of a headset using an audio switch to change the outputs used to play back content (e.g. from internal speaker to a headset), but does not teach a solution to switching the source of audio content. Thus, there remains a requirement for a demonstration system to switch audio sources upon detection of a consumer audio device in a safe and reliable manner.

BRIEF SUMMARY

In one aspect, a method for detecting a media device includes generating a waveform on a bias node of a demonstration system. The waveform has a fundamental frequency that is greater than a maximum frequency of a media frequency range of the demonstration system. The waveform is rectified to produce a detection signal. An impedance is modified between the bias node and a ground in response to a coupling of the media device to the bias node. A state of an output signal is changed in response to a change in the detection signal due to the modification of the impedance.

Embodiments may include one of the following features, or any combination thereof. At least one spurious signal is removed from the output signal. A one or more source inputs of the demonstration system is connected to the media device in response to the switching of the comparator output signal. The waveform is monotone. The waveform comprises a plurality of tones, each tone having a frequency that is greater than a maximum frequency of a media frequency range of the demonstration system. Modifying an impedance includes decreasing an impedance. The coupling of the media device to the bias node is a capacitive coupling. The coupling of the media device to the bias node is a lower impedance coupling than a coupling of a waveform generator to the bias node. The waveform is buffered prior to rectifying the waveform.

In another aspect, a media device detection system includes an impedance module configured to modify a bias impedance between a bias node and a ground when a media device is coupled to the bias node. A waveform generator is in electrical communication with a bias node of a demonstration system and is configured to generate a waveform having a fundamental frequency greater than a maximum frequency of a media frequency range of the demonstration system. A rectifier is in electrical communication with the bias node. The rectifier is configured to produce a detection signal from the waveform responsive to the modification of the impedance. A comparator is in electrical communication with the rectifier. The comparator is configured to switch a state of an output signal when the detection signal is less than a threshold of the comparator.

Embodiments may include one of the above and/or below features, or any combination thereof. A filter is in electrical communication with the comparator and is configured to remove at least one spurious signal from the output of the comparator. A filter is in electrical communication with the rectifier and is configured to remove at least one spurious signal from the detection signal. A media switch is configured to connect one or more source inputs of the demonstration system to the media device in response to the switching of the comparator. The media frequency range is an audio range. The media frequency range is a video range. The comparator includes a hysteresis voltage greater than a ripple voltage of the detection signal. Only one channel of the media device is in electrical communication with the bias node. The impedance module further comprises a first capacitor in electrical communication with the bias node and the rectifier. A first resistor is in electrical communication with the bias node and the waveform generator. A second capacitor is in electrical communication with the bias node and an electrical connector capable of receiving the media device. A buffer is in electrical communication with the bias node and the rectifier.

In another aspect, a method for detecting a media device includes generating a waveform on a bias node of a demonstration system. The waveform has a fundamental frequency that is greater than a maximum frequency of a media frequency range of the demonstration system. The waveform is rectified to produce a detection signal. An impedance is decreased between the bias node and a ground in response to a coupling of the media device to the bias node. A state of an output signal is changed in response to a change in the detection signal due to the decrease of the impedance. At least one spurious signal is removed from the output signal. A one or more source inputs of the demonstration system is connected to the media device in response to the switching of the comparator output signal.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Embodiments of systems described herein provide for the automatic detection of a consumer media device in a safe and reliable manner, and the change of a media source used by a demonstration system from preprogrammed content to that provided by the consumer. Accordingly, the consumer can experience the qualities of the system with their preferred media content. Preprogrammed content includes any content different than that provided by the consumer and used to demonstrate the qualities of the demonstration system. Examples of preprogrammed content include stored playlists on the demonstrations system and streaming media from the Internet.

In one example, the consumer media device is an audio entertainment device (e.g. an MP3 player). In another example, the consumer media device is a video device used for playing movies or streaming video. The scope of this disclosure is envisioned to include the detection of any device, whether provided by the consumer or not, that includes media content capable of being demonstrated on the demonstration system.

The auto-detection of a media device must not cause harm to the device. Accordingly, the embodiments described herein avoid exposing the media device to direct current (DC) levels. The auto-detection of the media device detects the presence of the device rather than the signal emanating from it. More specifically, the media device is detected by sensing a change in impedance caused by the connection of the media device to the demonstration system. Advantageously, this approach provides reliable device detection even if the device is not playing media content or has periods during which the device output signal is very weak. In contrast, relying on the signal from the device to detect the presence of the device can cause sporadic switching between the preprogrammed content from the demonstration system and that of the media device. In the various embodiments described herein, the reliable detection of the media device is not adversely affected by excessive media device volume or output signal.

Figure 1:
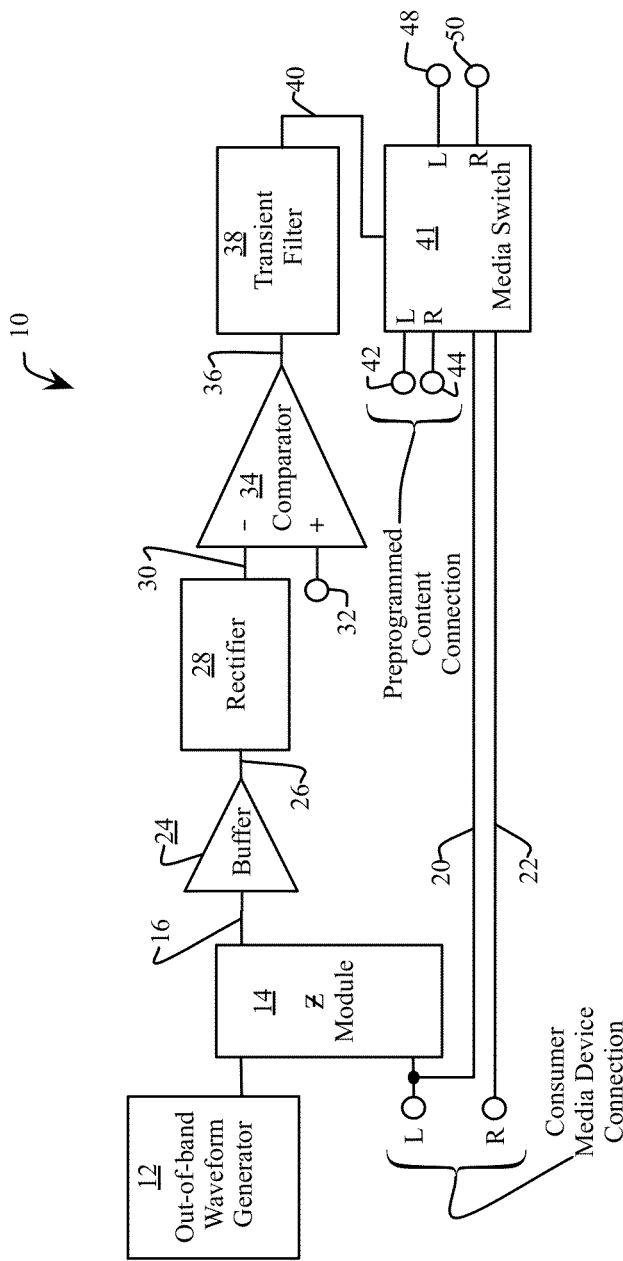
FIG. 1 is a functional block diagram view of an embodiment of a media device detection system according to the present invention.

FIG. 1 illustrates an embodiment 10 of the functional blocks of the media device auto-detection system. An out-of-band waveform generator 12 generates a signal with substantially all of the frequency components being above the range of a media content generated by either a media source in the demonstration system or the consumer media device. Specifically, the fundamental frequency (e.g. first harmonic) of the generated waveform is above a maximum frequency of the frequency range of the media content. In one embodiment, the generated waveform is monotonic (e.g. a pure sinusoid). In another embodiment, the generated waveform is a damped square wave, shaped to remove lower frequencies that can mix with the media content and degrade the fidelity of the output of the demonstration system. In addition, the use of a higher frequency waveform from the waveform generator 12 substantially eliminates direct current (DC) signals from feeding back to the consumer media device and potentially harming the device.

The output 13 of the waveform generator 12 connects to an impedance module 14 with an output 16. In one embodiment, the left audio channel 20 of a consumer media device electrically communicates with the impedance module 14, thereby modifying the Thevenin equivalent impedance of the impedance module 14 as measured between a bias node within the impedance module 14 (shown in FIG. 2) and a ground. In another embodiment, the right audio channel 22 of a consumer media device electrically communicates with the impedance module 14. In another embodiment, the media device provides a video channel in electrical communication with the impedance module 14, wherein the out-of-band waveform generator 12 generates a waveform above the video frequency range to be viewed on the demonstration system.

Optionally, the impedance module output 16 is buffered by a buffer 24. The buffer 24 outputs a signal 26 to a rectifier 28. The buffer 24 isolates the impedance at the output 16 from the rectifier 28. The rectifier 28 outputs a detection signal 30 whose DC level shifts depending on whether and how a consumer media device is connected to the impedance module 14. For example, if the left channel 20 of the consumer media device is referenced to ground, the waveform at the output 16 will have a root mean square (RMS) value that will be closer to ground when the media device is connected to the media device auto-detection system 10. In a preferred embodiment, the impedance of the consumer media device is lower than the impedance of the out-of-band waveform generator 12.

The comparator 34 compares the output 30 of the rectifier 28 to a threshold 32. In one embodiment, a consumer media device connected to the media device auto-detection system 10 reduces the impedance of the impedance module 14, thereby decreasing the RMS value of the waveform at the output 16 and the voltage of the detection signal 30. When the detection signal 30 is decreased to less than the threshold 32 the comparator output 36 transitions to high thus providing an enabling signal. The output 36 is filtered by a transient (e.g. low pass) filter 38 that removes spurious signals due to excessive signal voltage from the consumer media device and provides a stable enable signal 40 to a media switch 41. In one embodiment, the transient filter 38 filters the detection signal 30 before it is compared against the threshold 32 by the comparator 34.

When the enable signal 40 is low, indicating that there is no consumer media device connected to the media device auto-detection system 10, the media switch 41 connects the left and right channels 42 and 44 respectively of a preprogrammed content to the left and right channel outputs 48 and 50 respectively. For example, when the consumer media device is an audio device, the left and right channel outputs 48 and 50 respectively further connect to a speaker in one example. When the consumer media device is a video device, the left channel output 48 connects to a speaker and the right channel output 50 connects to a video monitor. In another example, the left channel output 48 is a video channel, whereby the out-of-band waveform generator 12 generates a waveform with a fundamental frequency above the range of frequencies used by the video channel. Upon receiving a positive enable signal 40, indicating that a consumer media device is connected to the media device auto-detection system 10, the media switch connects the left and right channels 20 and 22 respectively of the consumer media device to the left and right channel outputs 48 and 50 respectively.

Figure 2:
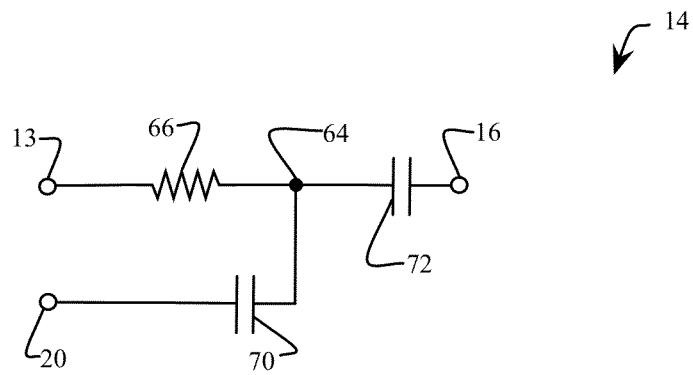
FIG. 2 is a schematic view of an embodiment of an impedance module according to the present invention.

FIG. 2 shows an embodiment of the impedance module 14 as shown in FIG. 1. The output 13 of the waveform generator 12 electrically connects to a bias node 64 through a resistor 66. The left channel output 20 of the consumer media device connects to the bias node 64 through a capacitor 70. The bias node 64 connects to an output 16 through a capacitor 72. In a preferred embodiment, the resistor 66 is 10 KΩ, the capacitor 70 is 0.01 uF, the capacitor 72 is 0.01 uF and the media device is an iPod®.

In another embodiment, the impedance module 14 connects to a right channel output 22 of the consumer media device. In another embodiment, the impedance module 14 connects to a video channel or a consumer media device. In addition to audio and video content, it is envisioned that that the concepts disclosed herein apply to other frequency ranges whereby the out-of-band waveform generator 12 provides a waveform with a fundamental frequency above the frequency range.

Coupling of a ground referenced media device to the impedance module 14 reduces the RMS voltage of the waveform on the bias node 64. In a preferred embodiment, an impedance of the media device measured between the bias node 64 and ground is substantially less than an impedance of the waveform generator 12 measured between the bias node 64 and ground. In another embodiment, the media device is reference to the supply voltage and results in an increase in the voltage of the bias node 64 when the media device is coupled to the impedance module 14. With reference to FIG. 1, the output of the rectifier 28 connects the positive input of the comparator 34 and the threshold connects to the negative input of the comparator 34 when used with a media device that is referenced to the supply voltage instead of ground.

Figure 3:
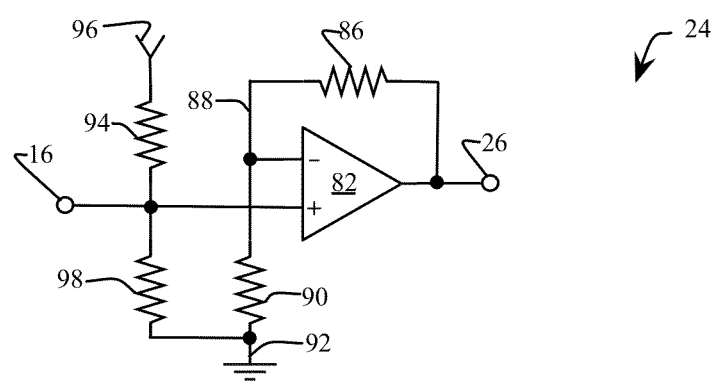
FIG. 3 is a schematic view of an embodiment of a buffer according to the present invention.

FIG. 3 shows an embodiment 24 of the buffer as shown in FIG. 1, used to isolate the impedance of the impedance module 14 from the rectifier 28. The buffer 24 includes an operational amplifier (op-amp) 82 with an output 26. A feedback resistor 86 connects the output 26 to the negative input 88 of the op-amp 82. A resistor 90 is connected between the negative input 88 and a ground 92. The ratio of the resistor 86 and the resistor 90 establishes the gain or amplification of the buffer 24. In a preferred embodiment, resistors 86 and 90 are 9.09 KΩ and 10 KΩ respectively, thus providing a slight attenuation of the output 16 of the impedance module 14. In another embodiment, the buffer 24 is a simple voltage follower with no attenuation. In another embodiment, the buffer 24 amplifies the output 16. A resistor 94 is connected between the supply voltage 96 and the output 16. A resistor 98 is connected between the output 16 and the ground 92. The output 16 connects to a positive input of the op-amp 82 and has a DC operating point established at substantially half of the supply voltage 96. In a preferred embodiment, resistors 94 and 98 are each 20 KΩ.

Figure 4:
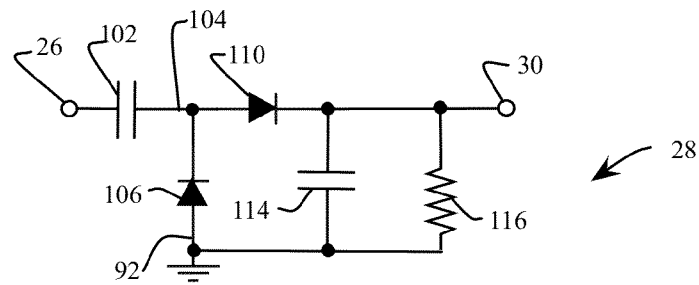
FIG. 4 is a schematic view of an embodiment of a rectifier according to the present invention.

FIG. 4 describes a preferred embodiment of the rectifier 28 in FIG. 1. The output 26 of the buffer 24 capacitively couples to a summing node 104 through a capacitor 102. The summing node connects to the anode of a diode 110, whose cathode connects to an output forming a detection signal 30. The summing node also connects to a cathode of diode 106, whose anode connects to the ground 92. Current will conduct through the diode 110 when the summing node 104 has a positive voltage (plus a diode threshold) relative to the voltage of the detection signal 30. Current will conduct through the diode 106 when the summing node 104 has a negative voltage (minus a diode threshold) relative to the ground 92. A capacitor 114 connects between the detection signal 30 and ground 92. A resistor 116 also connects to the detection signal 30 and ground 92. The capacitor 114 and the resistor 116 form a time constant which serves to reduce a ripple voltage on the detection signal 30. A ripple voltage is the difference between the maximum and minimum values of the detection signal 30. In a preferred embodiment, the capacitor 102 is 0.01 uF (e.g. same value as the capacitor 72), the capacitor 114 is 0.01 uF and the resistor 116 is 20 KΩ.

Figure 5:
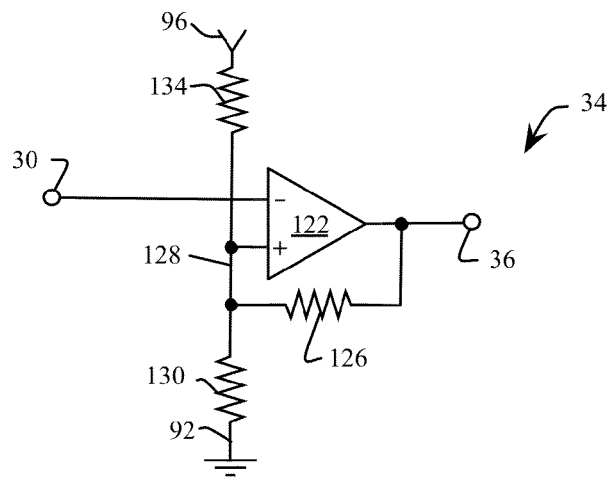
FIG. 5 is a schematic view of an embodiment of a comparator according to the present invention.

FIG. 5 describes a preferred embodiment of the comparator 34 in FIG. 1. The comparator 34 includes an op-amp 122 with an output 36. A feedback resistor 126 connects the output 36 to a positive input 128 of the op-amp 122. A resistor 130 is connected between the positive input 128 a ground 92. A resistor 134 is connected between the positive input 128 and the supply voltage 96. The detector signal 30 from the output of the rectifier connects to the negative input of the op-amp 122. In a preferred embodiment, the resistors 126, 130 and 134 are 61.9 KΩ, 27.4 KΩ and 12.1 KΩ respectively. The comparator 34 is configured to be a Schmitt trigger with hysteresis. Preferentially, the hysteresis value is larger than the worst-case ripple of the detection signal 30. The worst-case ripple is defined by the voltage variation of the detection signal 30 when a worst-case consumer device is either connected or disconnected from the media device auto-detection system 10.

Figure 6:
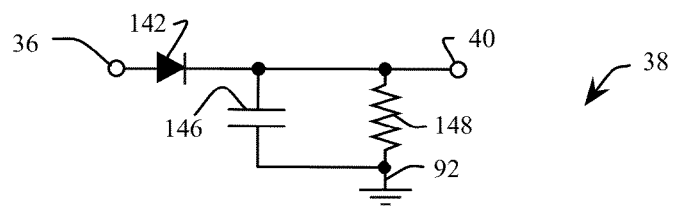
FIG. 6 is a schematic view of an embodiment of a transient filter according to the present invention.

FIG. 6 shows an embodiment of a transient filter 38 as shown in FIG. 1. The output 36 of the comparator 34 connects the anode of a diode 142. The cathode of the diode 142 is an enable signal 40 that enables the switching of inputs on a media switch 41. A capacitor 146 connects between the enable signal 40 and ground 92. A resistor 148 connects between the enable signal 40 and ground 92. The diode 142 ensures negative transients do not propagate to the media switch 41. The capacitor 146 and the resistor 148 removes positive spurious transients, for example due to excessive media device volume or output signal.

Figure 7:
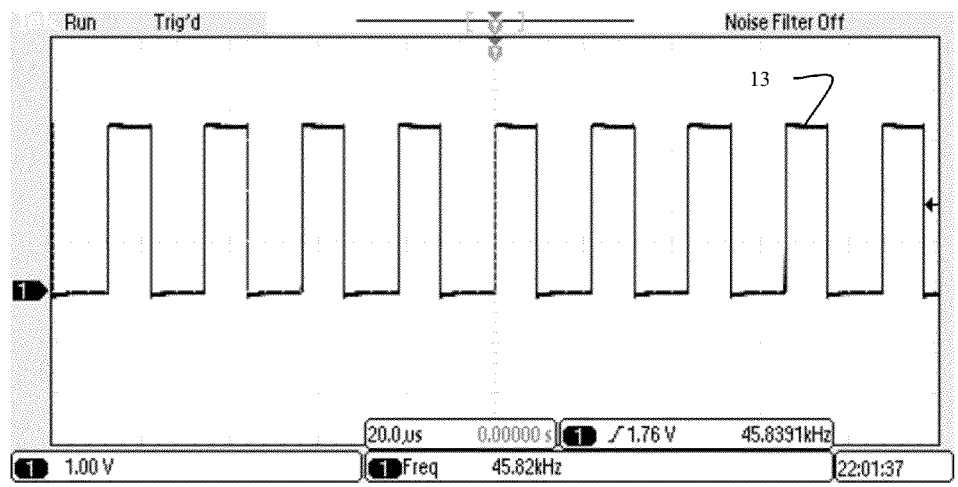
FIG. 7 is a plot of the output of a waveform generator.
Figure 8:
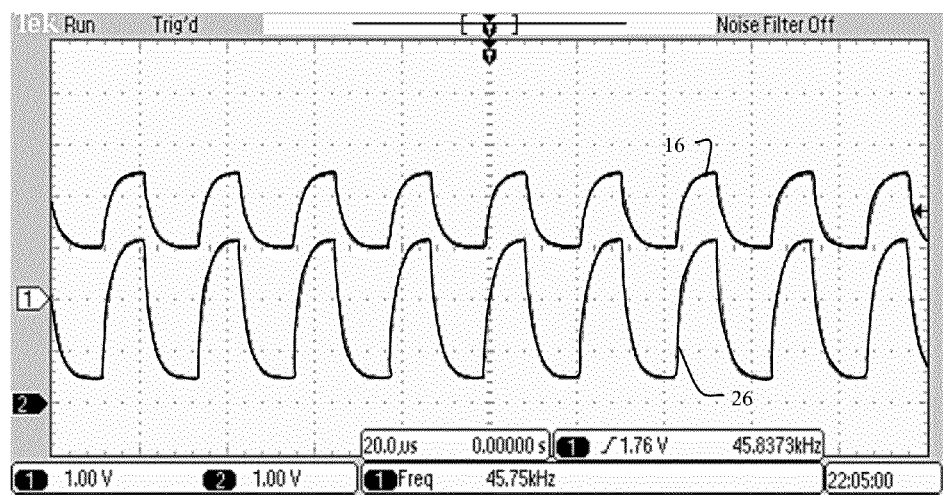
FIG. 8 is a plot of the input and output waveforms of the buffer shown in FIG. 3.
Figure 9:
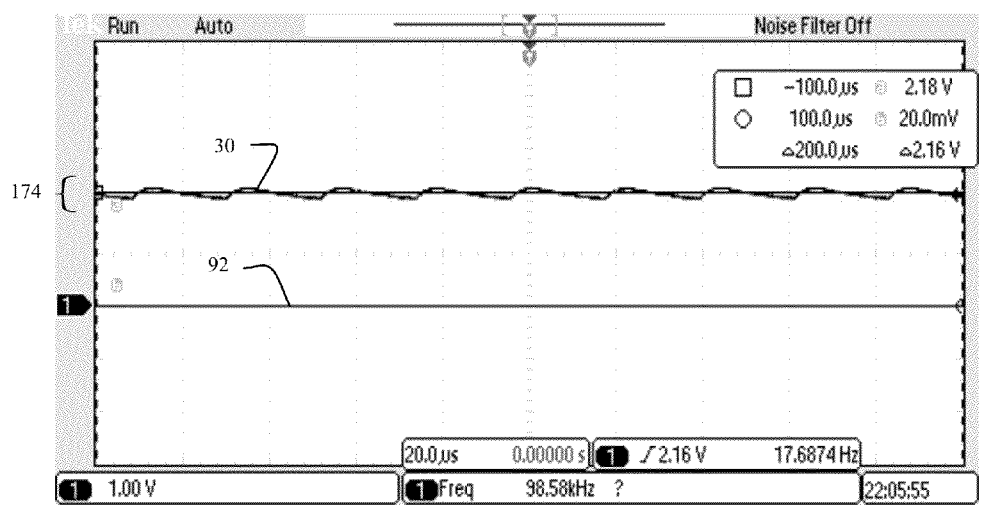
FIG. 9 is a plot of the output of the rectifier shown in FIG. 4.

An embodiment of the media device auto-detection system 10 was tested with successful results as shown in FIGS. 7, 8, 9 and 10. FIG. 7 shows the output 13 of the out-of-band waveform generator as a 45 KHz square wave, well above the typical audio range of 20 Hz to 20 KHz. FIG. 8 shows the impedance module output 16 with an iPod connected to the impedance module 14. The output 16 is an input the buffer 24. FIG. 8 also shows the buffer output 26 as an amplified signal. FIG. 9 shows the detection signal 30 relative to ground 92 with an iPod connected to the impedance module 14. The detection signal 30 has a ripple voltage 174, which preferentially is less than the hysteresis of the comparator 34.

Figure 10:
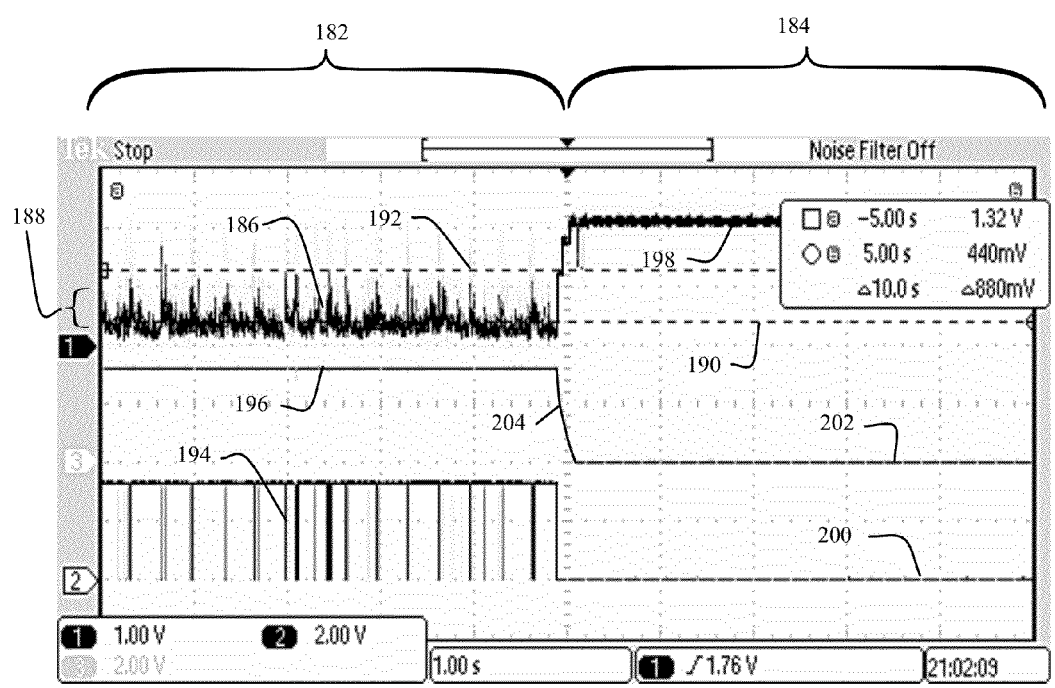
FIG. 10 is a plot of the input and output waveforms of the comparator shown in FIG. 5 and the filtered output from the filter shown in FIG. 6.

FIG. 10 illustrates the behavior of the media device auto-detection system 10 while an iPod is connected during the connection phase 182, and after the iPod is disconnected during the disconnection phase 184. When a media device is connected to the media device auto-detection system 10 and the media device volume level is very high, large transient voltages exist on the detection signal 186, which cause the comparator 34 to falsely trip. The large transient voltages effectively increase the effective ripple voltage, (shown as 174 in FIG. 9), causing a transient range 188. The transient range 188 exceeds the hysteresis of the comparator 34 set by a lower threshold 190 of 440 mV and an upper threshold 192 of 1.32V. The transient range 188 causes false transitions 194 on the comparator output 36 when the detection signal 186 is greater than the upper threshold 192 of the comparator 34.

The false transitions 194 caused by excessive transient voltages are removed by the transient filter 38 to produce a stable enable signal 196.

When the media device is removed from the media device auto-detection system 10 and the disconnection phase 184 is entered, the detection signal 198 rises above the upper threshold 192 of the comparator 34. In addition, the detection signal 198 no longer contains excessive transient voltages because the media device is removed. The detection signal 198 results in a low value on the output 36 of the comparator, which is subsequently filtered by the transient filter 38 to produce a low value enable signal 202. The time constant formed by the capacitor 146 and the resistor 148 in the transient filter 38 causes a smooth decay 204 of the enable signal 196 over 200 msec during the transition between the connection phase 182 and the disconnection phase 184.

A number of implementation have been described. Nevertheless, it will be understood that additional modifications may be made without departing from the scope of the inventive concepts described herein, and, accordingly, other embodiments are within the scope of the following claims:

What is claimed is:

1. A method for detecting a media device comprising:
   generating a waveform on a bias node of a demonstration system, the waveform having a fundamental frequency that is greater than a maximum frequency of a media frequency range of the demonstration system;
   rectifying the waveform to produce a detection signal;
   modifying an impedance between the bias node and a ground in response to a coupling of the media device to the bias node; and
   changing a state of an output signal in response to a change in the detection signal due to the modification of the impedance.

2. The method of claim 1 further comprising removing at least one spurious signal from the output signal.

3. The method of claim 1 further comprising connecting one or more source inputs of the demonstration system to the media device in response to the switching of the comparator output signal.

4. The method of claim 1 wherein the waveform is monotone.

5. The method of claim 1 wherein the waveform comprises a plurality of tones, each tone having a frequency that is greater than a maximum frequency of a media frequency range of the demonstration system.

6. The method of claim 1 wherein modifying an impedance includes decreasing an impedance.

7. The method of claim 1 wherein the coupling of the media device to the bias node is a capacitive coupling.

8. The method of claim 1 wherein the coupling of the media device to the bias node is a lower impedance coupling than a coupling of a waveform generator to the bias node.

9. The method of claim 1 further comprising buffering the waveform prior to rectifying the waveform.

10. A media device detection system comprising:
    an impedance module configured to modify a bias impedance between a bias node and a ground when a media device is coupled to the bias node;
    a waveform generator in electrical communication with a bias node of a demonstration system and configured to generate a waveform having a fundamental frequency greater than a maximum frequency of a media frequency range of the demonstration system;
    a rectifier in electrical communication with the bias node, the rectifier configured to produce a detection signal from the waveform responsive to the modification of the impedance; and
    a comparator in electrical communication with the rectifier, the comparator configured to switch a state of an output signal when the detection signal is less than a threshold of the comparator.

11. The device of claim 10 further comprising a filter in electrical communication with the comparator and configured to remove at least one spurious signal from the output of the comparator.

12. The device of claim 10 further comprising a filter in electrical communication with the rectifier and configured to remove at least one spurious signal from the detection signal.

13. The device of claim 10 further comprising a media switch configured to connect one or more source inputs of the demonstration system to the media device in response to the switching of the comparator.

14. The device of claim 10 wherein the media frequency range is an audio range.

15. The device of claim 10 wherein the media frequency range is a video range.

16. The device of claim 10 wherein the comparator includes a hysteresis voltage greater than a ripple voltage of the detection signal.

17. The device of claim 10 wherein only one channel of the media device is in electrical communication with the bias node.

18. The device of claim 10 wherein the impedance module further comprises a first capacitor in electrical communication with the bias node and the rectifier, a first resistor in electrical communication with the bias node and the waveform generator and a second capacitor in electrical communication with the bias node and an electrical connector capable of receiving the media device.

19. The device of claim 10 further comprising a buffer in electrical communication with the bias node and the rectifier.

20. A method for detecting a media device comprising:
    generating a waveform on a bias node of a demonstration system, the waveform having a fundamental frequency that is greater than a maximum frequency of a media frequency range of the demonstration system;
    rectifying the waveform to produce a detection signal;
    decreasing an impedance between the bias node and a ground in response to a coupling of the media device to the bias node;
    changing a state of an output signal in response to a change in the detection signal due to the decrease of the impedance;
    removing at least one spurious signal from the output signal; and
    connecting one or more source inputs of the demonstration system to the media device in response to the switching of the comparator output signal.

* * * * *